United States Patent Office 3,829,527
Patented Aug. 13, 1974

3,829,527
ROOM TEMPERATURE CURABLE ORGANOPOLYSILOXANES
Guenther Fritz Lengnick, Adrian, Mich., assignor to Stauffer Chemical Company, New York, N.Y.
No Drawing. Continuation-in-part of abandoned application Ser. No. 270,354, July 10, 1972. This application June 8, 1973, Ser. No. 368,410
Int. Cl. C08f 35/02
U.S. Cl. 260—827                                    11 Claims

ABSTRACT OF THE DISCLOSURE

The invention relates to novel cross-linking agents and to curable one-component organopolysiloxanes which are obtained from the reaction of hydroxyl-terminated organopolysiloxanes and the novel disilane cross-linking agents having functional groups which are hydrolyzable at ambient moisture.

---

This application is a continuation-in-part of applicant's copending application Ser. No. 270,354, filed July 10, 1972 and now abandoned.

This invention relates to curable one-component organopolysiloxanes, particularly organopolysiloxanes which are activated in the presence of moisture and more particularly to curable organopolysiloxanes which are obtained from the reaction of disilane cross-linking agents having groups which are hydrolyzable at ambient moisture and hydroxyl-terminated organopolysiloxanes.

Heretofore, it was known that certain fluid organopolysiloxanes, when exposed to atmospheric moisture at room-temperature are converted to an elastomeric state. The desirability of a room-temperature curing system is well known; however, the conventional room-temperature curing system involves two or more stable components which, when mixed together, rapidly cure to a solid workable state. In other words, the end-user was provided with a two-package system in which one component was added just prior to use. Although the two-package system is adequate for many applications, there are other applications where the two-package system is undesirable because of the lack of skilled workmen or because the equipment is inadequate to carry out the necessary mixing operation.

Although the silicone industry has been provided with a single-package room-temperature curable organopolysiloxane composition containing various hydrolyzable groups, these curable single-package compositions have been difficult to adapt to circumstances where extended working times are necessary or desirable. Also, in some commercial applications, it is desirable to provide organopolysiloxane compositions which will cure to an elastomer which is resistant to compression, has greater solvent resistance, has improved cross-linking and improved hardness. Heretofore, none of the organopolysiloxanes commercially available provide all of these desirable properties.

It is therefore an object of this invention to provide an organopolysiloxane which is curable at room-temperature. Another object of this invention is to provide compositions which have varying working times without reducing the cross-linking ability of the polymers employed. Still another object of this invention is to provide a curable organopolysiloxane having improved physical properties. A further object of this invention is to provide novel cross-linking agents which will react with hydroxyl-terminated organopolysiloxanes to form elastomeric materials having improved properties. A still further object of this invention is to provide organopolysiloxane compositions which may be dispensed in a single-package.

The foregoing objects and other which will become apparent from the following description, are accomplished in accordance with this invention, generally speaking, by providing curable organopolysiloxane compositions of the general formula:

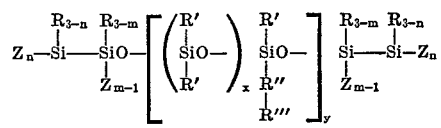

wherein R and R' which may be the same or different represent monovalent hydrocarbon radicals, halogenated monovalent hydrocarbon radicals or cyanoalkyl radicals; R'' is a divalent hydrocarbon radical; R''' is a polymeric organic radical linked to R'' by a carbon-to-carbon linkage; Z is a radical hydrolyzable by ambient moisture; $m$ is a number of from 1 to 3, $n$ is a number of from 0 to 3 and the sum of $m$ and $n$ is greater than 2; $x$ is a number of from 0 to 20,000 and $y$ is a number of from 1 to 500.

The organopolysiloxane compositions of this invention are prepared by reacting disilanes of the general formula:

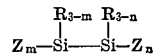

with an organolpolysiloxane of the formula:

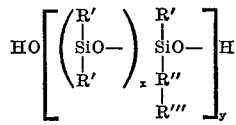

in which R, R', R'', R''', Z, $m$, $n$, $x$ and $y$ are the same as those represented above. Organic radicals repersented by R and R' are alkyl radicals having from 1 to 18 carbon atoms such as methyl, ethyl, propyl, butyl, hexyl, octyl, decyl, dodecyl, tetradecyl, octadecyl; aryl radicals such as phenyl, diphenyl, naphthyl and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluorophenyl and the like; alkenyl radicals such as vinyl, allyl and the like. The group represented by R'' is a divalent radical having from 1 to 18 carbon atoms such as methylene, ethylene, propylene, tetramethylene, hexamethylene, octamethylene, octadecylmethylene and the like; R''' is a polymer or copolymer linked to the organopolysiloxane "backbone" through the carbon-to-carbon linkage of the divalent hydrocarbon radicals represented by R'' above. Z represents radicals which are hydrolyzable by ambient moisture such as monoacyloxy radicals of carboxylic acids (OOCR''''), hydroxycarbonoxy [OR''''], aminooxy

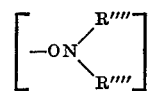

and phosphato

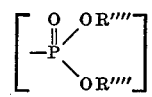

radicals, in which R'''' represent monovalent hydrocarbon radicals or halogenated monovalent hydrocarbon radicals. Other groups represented by Z above are amino radicals

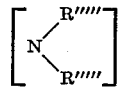

and amido radicals

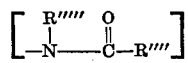

in which R''''' is the same as R'''' or hydrogen. Examples of acyloxy radicals are formoxy, acetoxy, propionyloxy, valeryloxy, caproyloxy, myristoyloxy, and stearoyloxy radicals. Other hydrolyzable groups are hydrocarbonoxy groups having from 1 to 10 carbon atoms such as methoxy, ethoxy, butoxy, heptoxy, octoxy, decoxy, pentoxy, phenoxy and the like; aminooxy groups such as dimethylaminooxy, diethylaminooxy, dipropylaminooxy, dibutylaminooxy, dioctylaminooxy, diphenylaminooxy, ethylmethylaminooxy, methylphenylaminooxy and the like. Suitable oximo groups are acetophenoximo, acetoximo, benzophenoximo, 2-butanoximo, diisopropylketoximo, chlorocyclohexanoximo, alpha-bromoacetophenoximo and the like. Examples of suitable phosphato groups are dimethylphosphato, diethylphosphato, dipropylphosphato, dibutylphosphato, dihexylphosphato, dioctylphosphato, didodecylphosphato, dioctadecylphosphato, methylethylphosphato, ethylpropylphosphato, methylhexylphosphato, butylhexylphosphato, methyldodecylphosphato, methyloctadecylphosphato, ethyltetradecylphosphato, diphenylphosphato, methylphenylphosphato, butylphenylphosphato and the like. Amine radicals having up to 10 carbon atoms which may be employed in this invention are N,N-dimethylamino, N,N-dibutylamino, N,N-dihexylamino, N-methyl-N-ethylamino, N-methylamino, N-hexylamino, N-phenylamino and the like. Examples of suitable amino radicals are acetamido, propionamido, acrylamido, hexanamido, pentadecanamido, dodecanediamido, malonamido, phthalamido, naphthalamido, 2-naphthamido and the like.

The cross-linking agents of this invention are prepared by reacting halogenated organodisilanes with an organic compound having the appropriate functional groups to form compounds having groups which are hydrolyzable at ambient moisture. For example 1,1,1,2-tetra chloro-2,2-dimethyl disilane may be reacted with an amine, e.g., diethylhydroxylamine in accordance with the following equation:

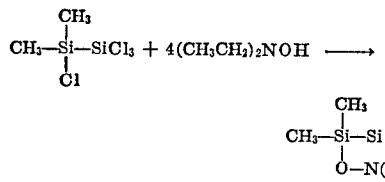

Instead of the hydroxylamine, the halo-organodisilanes may be reacted with organic acids or their anhydrides, oximes, amines, amides or phosphato compounds to form compounds having functional groups which are hydrolyzable in ambient moisture.

Disilanes having phosphato functional groups may also be prepared by reacting halogen containing disilanes with an alkali metal or alkaline earth metal salt in the presence of an inert organic solvent.

Generally, these halogen containing organodisilanes are reacted with organic compounds containing the appropriate functional groups at a temperature of from about room-temperature up to about 150° C., preferably from about 40° C. to about 120° C. in the presence of a solvent which is inert to the reactants and the reaction product. Suitable solvents include aliphatic hydrocarbons such as pentane, hexane, heptane, octane; aromatic hydrocarbons such as benzene, toluene, xylene, naphthalenes, as well as halogenated solvents such as methyl chloride, chlorobenzene and the like. Other solvents which may be used are organic ethers such as petroleum ether, diethyl ether, dibutyl ether and hydroxyl-free fluid siloxanes.

The conventional organopolysiloxanes described heretofore may be prepared from difunctional organosilanes of the formula:

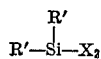

wherein R' which may be the same or different represent halogenated or unhalogenated monovalent aliphatic, alicyclic or aromatic hydrocarbon radicals, such as methyl, ethyl, vinyl, allyl, cyclohexyl, cyclohexenyl, phenyl, tolyl and cyanoalkyl radicals and X represents a hydrolyzable atom or group such as halogen atoms or alkoxy groups. The diorganopolysiloxanes may be homopolymers as well as copolymers, that is, compounds derived from two or more different diorganosilanes and even organic radicals linked to any particular silicon atom may be different organic radicals.

The conventional organopolysiloxanes described above are contacted with an organic monomer having aliphatic unsaturation in the presence of a free-radical initiator to form a modified organosilicon polymer having attached thereto at least one or more side chains or branches consisting of a carbon chain polymer. In the grafting step, hydrogen is abstracted from the organopolysiloxane by the free-radical initiator to form an active site for the connecting polymer.

Any organopolysiloxane may be used as the "backbone" polymer providing that it is capable of producing free radicals or active sites under the proper conditions. Thus, the "backbone" polymer should be one which is capable of producing a substantial and recognizable number of free radicals and it should be substantially free of any tendency to undergo any further polymerization under the conditions employed. The "backbone" polymer therefore should be one which is substantially free of any aliphatic unsaturation; however, a low degree of any such unsaturation does not preclude the desired reaction, even though it may set up a competitive reaction which is preferably avoided. It is preferred that the organopolysiloxane have lower alkyl radicals attached to the silicon atoms since these are more amenable to hydrogen abstraction than other radicals. In addition, it is generally advisable to use organopolysiloxanes substantially free of silicon-bonded hydrogen.

Examples of suitable organopolysiloxane polymers and copolymers which may be used in the formation of grafted polymers are hydroxyl-terminated siloxane fluids (OH-Fluids) having methyl, phenyl or methylvinyl groups and copolymers of dimethylsiloxane and phenylmethyl or diphenylsiloxane units.

Any polymerizable organic monomer having aliphatic olefinic bonds may be grafted to the organopolysiloxane "backbone." Examples of suitable olefinic compounds are low molecular weight straight-chained hydrocarbons such as ethylene, propylene, butylene; vinyl halides such as vinylchloride and vinylfluoride; vinyl esters of organic acids such as vinyl acetate; styrene, ring-substituted styrenes and other vinyl aromatics such as vinyl pyridine and vinyl naphthalene; acrylic acid and derivatives of acrylic acid including the salts, esters, amides and acrylonitrile; n-vinyl compounds such as n-vinyl carbazole, n-vinyl pyrrolidone and n-vinyl caprolactam and vinyl silicon compounds such as vinyl triethoxysilane.

Di-substituted ethylenes of the type $CH_2=CX_2$ may be used including vinylidene fluoride, vinylidene chloride, vinylidene cyanide, methacrylic acid and compounds derived therefrom such as the salts, esters and amides as well as methacrolein, methacrylatonitrile and the like.

Examples of di-substituted ethylenes of the type $CHX=CHX$ such as vinylene carbonate and various monomers which polymerize best in the presence of other monomers, e.g., maleic anhydride, esters of maleic and fumaric acids, stilbene, indene and coumerone may be used in the formation of these graft polymers.

As before emphasized, the monomers may be used singly or in combination of two or three or even more. The properties of the graft product, of course, depend on the nature and identity of the monomer materials as well as on the amounts used relative to the organopolysiloxanes.

The grafting operation is more expeditiously effected by using a free-radical initiator, normally organic peroxides, although other free-radical initiators such as azo compounds in which both the N atoms of the azo linkage are attached to a tertiary-carbon atom and the remaining valences of the tertiary-carbon atom are satisfied by nitrile, carboxy, cycloalkylene or alkyl radicals, preferably having from 1 to 18 carbon atoms. In addition to the above mentioned initiators, ionized radiation may also be used to bring about the formation of free radicals.

The amount of free-radical initiator used is not critical; thus, any amount capable of producing a preceptable degree of grating is suitable. Generally, as low as 0.05 percent of the more active peroxide initiators based on the weight of the monomer is adequate in most cases. However, where it is desirable to increase the reaction rate, then as much as 3 percent or even more of the initiator may be used.

The grafting step may be carried out at a temperature between about 25° C. and about 150° C., preferably between about 60° C. and 130° C. in the presence of the free-radical initiators. Where the reaction is carried out in the absence of these initiators, a substantially higher temperature, often up to as high as 200° C., may be advantageously used.

Although the grafting step may be conducted in the presence of an inert solvent, that is, a solvent which is unreactive with the monomer or the organopolysiloxane in the presence of a free-radical initiator, it is preferred that the grafting step be conducted in the absence of a solvent. Examples of solvents which may be employed, where desired are hexane, heptane, benzene, toluene, xylene, naphthenes and the like.

Although it may be possible to carry out the grafting procedure using organopolysiloxanes free of terminal hydroxyl groups or groups hydrolyzable by ambient moisture and to subsequently treat the grafted polymer to incorporate such groups, it is preferred in the grafting operation to use an organopolysiloxane having terminal hydroxyl groups. Following this procedure, the graft polymer is appropriately treated to substitute groups which are hydrolyzable by ambient moisture for the hydroxyl groups.

The grafted products may be separated from the unreacted monomers by any conventional technique known in the art, such as by distillation, solvent extraction or selected solvent fractionation.

The curable compositions of this invention may be prepared by reacting disilanes containing functional groups which are hydrolyzable in ambient moisture with organopolysiloxanes at any convenient temperature. Although in general, temperatures ranging from about 20° C. to 100° C. are sufficient, it should be understood, of course, that higher or lower temperatures may be employed if desired, although preferably, the reaction should be carried out at temperatures below about 200° C. If desired, the reaction may be carried out in the presence of an inert solvent which is unreactive with both the terminal hydroxyl groups on the organopolysiloxane or the functional groups on the disilanes. Solvents which may be used include hydrocarbons such as benzene, toluene, xylene; halogenated solvents such as ethylene chloride, perchloroethylene, chlorobenzene and the like; organic ethers such as diethyl ether, dibutyl ether or hydroxyl-free fluid siloxanes. The presence of solvents is particularly desirable when the hydroxyl-terminated organopolysiloxane has a high viscosity. In these cases, the solvent reduces the over-all viscosity of the mixture and facilitates the reaction.

The ratio of disilane cross-linking agent to organopolysiloxane is not critical. However, it is preferred that at least one mole of the cross-linking agent be used per mole of silicon-bonded hydroxyl group and more preferably from about two to five moles of the disilane be used per mole of silicon-bonded hydroxyl group connected to the organopolysiloxane. It is possible to use up to about twelve moles of the disilane per mole of silicon-bonded hydroxyl group since a large excess of the disilane insures complete reaction with all of the silicon-bonded hydroxyl groups. It is preferred that the reaction be carried out in the absence of moisture since the latter may interfere with the reaction. However, traces of moisture are not especially harmful if an excess of the disilane cross-linking agent is employed.

The compositions of this invention may consist solely of the reaction product of an organopolysiloxane and a disilane crosslinking agent containing hydrolyzable groups. However, for modifying the consistency of the uncured composition or to reinforce the cured product or for some other purpose, mineral fillers in the form of very fine powders may be added.

Examples of mineral fillers which may be used are various kinds of silicas, oxides of iron, zinc, cadmium, aluminum and carbonates. The proportion and type of filler employed will depend to a certain extent on the use to which the composition is to be applied. Silica obtained by precipitation, for example, those sold under the trade names Santo-Sil and Hi-Sil and silicas obtained from combustion such as sold under the trade name Aero-Sil are particularly suitable for the production of reinforced elastomeric products. These microfine silicas have a large absorptive surface and are effective even in small quantities. Fillers such as milled natural silicas and calcium carbonate can, on the other hand, be employed in large proportions, for example, 200 percent based on the weight of the organopolysiloxane.

In addition to the fillers mentioned heretofore, compositions conforming to the invention may contain coloring agents, thixotropic agents, agents capable of preventing the passage of ultraviolet light, desiccants and antioxidants.

In addition to the constituents mentioned above, the composition may contain for the purpose of accelerating the curing rate certain compounds which have a catalytic effect on the condensation reactions. Although several compounds are known to have a catalytic effect on the curing rate, organotin compounds are the preferred compounds. Examples of suitable catalysts are the tin salts of organic acids, such as tin naphthenate, tin 2-ethylhexoate, tin benzoate, dibutyltin dilaurate, dibutyltin diacetate, bis-(dibutyltin oleate) oxide, bis-(dibutyltin stearate) oxide, dibutyltin oleate hydroxide and the like. The catalysts may be used in an amount of from about 0.001 to about 1 percent, preferably from about 0.2 to about 0.5 percent by weight based on the weight of the organopolysiloxane.

Curable compositions may be prepared by mixing liquid hydroxyl-terminated organopolysiloxanes and a filler in any conventional mixing apparatus such as a Sigma blade mixer, roller mill, Banbury Mixer and the like and thereafter heating the mixture for a sufficient time to eliminate all traces of moisture. The mass is cooled and the disilane cross-linking agent containing hydrolyzable groups is added and, if desired, a catalyst and an anhydrous organic diluent. The compositions may be used immediately or they may be transferred under anhydrous conditions to dry containers which are hermetically sealed. The products thus prepared may be kept for several months and even years.

The compositions may be cured by merely exposing them to atmospheric moisture with or without any additional water vapor. Upon exposure to moisture, the compositions cure in a few minutes up to several hours or days depending upon the type of groups present on the cross-linking agent. In general, an increase in molecular weight of any of the groups will increase the time of cure.

The products of this invention adhere to a variety of materials such as wood, metal, glass, ceramics, plastics and the like. In the case of metals, it may be desirable to pretreat the metal before applying the compositions of this invention. These self-curing compositions may serve as caulking materials, as coatings for various articles such as electrical equipment, glass, metals and fabrics.

Various aspects of the invention are further illustrated by the following examples which are not to be taken as

EXAMPLE 1

Approximately 183 parts of 1,1,1,2-tetrachloro-2,2-dimethyldisilane are added to a reactor containing about 337 parts of acetic anhydride and heated to reflux temperature for about 2 hours. After removing the acetyl chloride at a temperature of about 150° C., the reaction mass is stripped under vacuum for about 1 hour to remove the volatile materials. The solid residue is first washed with acetic anhydride, then heptane and dried at a temperature of about 50° C. The product is identified as 1,1,1,2-tetraacetoxy-2,2-dimethyldisilane.

EXAMPLE 2

In accordance with the procedure described in Example 1, about 156 parts of 1,1,1-trichloro-2,2,2-trimethyldisilane are added to a reactor containing about 260 parts of acetic anhydride and heated to reflux temperature. A residual product is recovered which is identified as 1,1,1-triacetoxy-2,2,2-trimethyldisilane.

EXAMPLE 3

Approximately 630 parts of N,N-diethylhydroxylamine dissolved in about 170 parts of dry heptane are added to a reactor containing about 183 parts of 1,1,1,2-tetrachloro-2,2-dimethyldisilane in about 250 parts of dry heptane and heated to reflux temperature for about 1 hour. A precipitate is formed which is removed by filtration and identified as N,N-diethylhydroxylamine hydrochloride. The heptane solvent and excess N,N-diethylhydroxylamine are removed in vacuo, yielding a residual product which is identified as 1,1,1,2 - tetrakis(diethylaminooxy)-2,2-dimethyldisilane.

EXAMPLE 4

In accordance with the procedure described in Example 3, about 1600 parts of N,N-dioctylhydroxylamine dissolved in about 400 parts of dry heptane are added to a reactor containing about 183 parts of 1,1,1,2-tetrachloro-2,2-dimethyldisilane in about 230 parts of dry heptane and heated to reflux temperature for about 1 hour. A precipitate which is identified as N,N-dioctylhydroxylamine hydrochloride is formed which is removed by filtration and the heptane solvent and excess N,N-dioctylhydroxylamine are removed in vacuo yielding a residual product identified as 1,1,1,2-tetrakis(dioctylaminooxy)-2,2-dimethyldisilane.

EXAMPLE 5

In accordance with the procedure described in Example 3, 930 parts of N,N-diethylhydroxylamine in about 250 parts of dry heptane are added to a reactor containing about 200 parts of 1,1,1,2,2,2 - hexachlorodisilane in about 250 parts of dry heptane and heated to reflux temperature for about 1 hour. A residual product is recovered which is identified as 1,1,1,2,2,2 - hexakis(diethylaminooxy)disilane.

EXAMPLE 6

About 250 parts of acetoxime dissolved in about 357 parts of ethyl ether are added dropwise with stirring to a reactor containing a solution of 183 parts of 1,1,1,2-tetrachloro-2,2-dimethyldisilane dissolved in about 600 parts of toluene and about 900 parts of pyridine. As the exothermic reaction progresses, small increments of the toluene are added to disperse the large volume of pyridine hydrochloride formed. After the reaction is complete, the reaction mass is cooled to room-temperature and the product mixture filtered and stripped of toluene and excess pyridine. A residual product is recovered which is identified as:

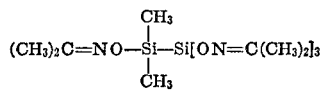

EXAMPLE 7

In accordance with the procedure described in Example 6, about 670 parts of benzophenoxime dissolved in about 600 parts of ethyl ether is added dropwise with stirring to a solution containing 183 parts of 1,1,1,2-tetrachloro-2,2-dimethyldisilane, about 600 parts of toluene and about 320 parts of pyridine. A residual product is recovered which is identified as:

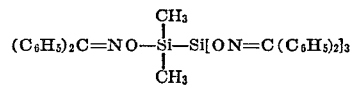

EXAMPLE 8

In accordance with the procedure described in Example 6, about 450 parts of butyraldehyde oxime in about 600 parts of ethyl ether is added dropwise with stirring to a solution containing 200 parts of 1,1,1,2,2,2-hexachlorodisilane and about 480 parts of pyridine. A reaction product is recovered which is identified by chemical analysis as:

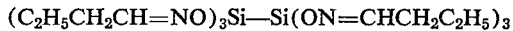

EXAMPLE 9

Approximately 520 parts of diethylhydrogen phosphate are added to about 520 parts of benzene and introduced into a reactor containing 183 parts of 1,1,1,2-tetrachloro-2,2-dimethyldisilane in about 500 parts of benzene. The reactants are heated to reflux temperature for about 1 hour with agitation and then nitrogen is passed through the solution for approximately 4 hours. The solvent and volatile materials are distilled off at reduced pressure. A residual product is recovered which is identified as 1,1,1,2-tetrakis-(diethylphosphato)-2,2-dimethyldisilane.

EXAMPLE 10

In accordance with the procedure described in Example 9, approximately 650 parts of dimethyl hydrogen phosphate in about 600 parts of benzene are introduced into a reactor containing about 200 parts of 1,1,1,2,2,2-hexachlorodisilane in about 600 parts of benzene and heated to reflux temperature for about 1 hour. After the volatile materials and solvent are removed, a residual product is recovered which is identified as 1,1,1,2,2,2-hexakis-(dimethylphosphato)disilane.

EXAMPLE 11

In accordance with the procedure described in Example 9, about 850 parts of diphenyl hydrogen phosphate in about 800 parts of benzene are introduced into a reactor containing about 172 parts of 1,1,2,2-tetrachloro-1,2-dimethyldisilane dissolved in about 300 parts of benzene and heated to reflux temperature for about 2 hours with agitation. After the volatile materials and excess solvent are removed under vacuum distillation, a residual product is recovered which is identified as 1,1,2,2-tetrakis-(diphenylphosphato)-1,2-dimethyldisilane.

EXAMPLE 12

Approximately 250 parts of acetamide in about 300 parts of chloroform are added to a reactor containing about 228 parts of 1,1,1,2-tetrachloro-2,2-dimethyldisilane, about 250 parts of chloroform and about 140 parts of pyridine and heated to reflux temperature for about 1 hour. The reaction mass is cooled to room-temperature, filtered and stripped of solvent. A residual product is recovered which is identified as:

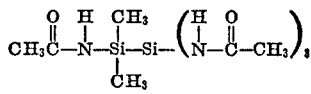

EXAMPLE 13

Approximately 300 parts of butylamine in about 300 parts of benzene are added to a reactor containing about 228 parts of 1,1,1,2-tetrachloro-2,2-dimethyldisilane, about 250 parts of chloroform and about 140 parts of pyridine and heated to reflux temperature for about 1 hour. The reaction mass is cooled to room-temperature, filtered and stripped of benzene. A residual product is recovered which is identified as:

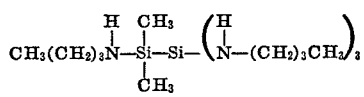

EXAMPLE 14

Approximately 440 parts of benzylamine in about 400 parts of chloroform are added to a reactor containing about 228 parts of 1,1,1,2-tetrachloro-2,2-dimethyldisilane, about 250 parts of chloroform and about 140 parts of pyridine and heated to reflux temperature for about 1 hour. The reaction mass is cooled to room-temperature, filtered and stripped of solvent. A residual product is recovered which is identified as:

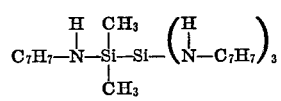

EXAMPLE 15

Grafted organopolysiloxanes are prepared by reacting olefinic monomers with hydroxyl-terminated polydimethylsiloxanes in the presence of a free-radical initiator at a temperature of from about 60° C. to 190° C. The unreacted olefinic monomers are removed at an elevated temperature by applying a vacuum of about 1 mm. Hg or less while stirring for an additional hour. The pertinent data is illustrated in Table I.

TABLE I

| Example number | Olefinic monomers | | Hydroxylated fluid | | Free-radical initiator | | Reaction conditions | | Final polymer viscosity, cs. |
|---|---|---|---|---|---|---|---|---|---|
| | Type | Parts | Viscosity, cs. | Parts | Type | Parts | Temp., °C. | Time, hr. | |
| 15(a) | Acrylonitrile / Butyl acrylate | 14.6 / 35.4 | 1,900 | 50 | t-BP | 0.5 | 80 | 1.5 | 14,000 |
| 15(b) | Acrylonitrile / Butyl acrylate | 9.0 / 51.0 | 800 | 40 | t-BP | 0.5 | 80 | 1.7 | 7,800 |
| 15(c) | Acrylonitrile / Ethyl acrylate / Butyl acrylate | 9.1 / 2.9 / 48.0 | 800 | 40 | t-BP | 0.25 | 80 | 2.0 | 20,200 |
| 15(d) | Methyl acrylate | 50.0 | 400 | 50 | t-BP | 0.5 | 80 | 4.0 | 15,500 |
| 15(e) | Laurel methacrylate | 70.0 | 400 | 30 | t-BP | 0.5 | 80 | 5.0 | 19,400 |
| 15(f) | Styrene / Butyl acrylate | 250.0 / 204.0 | 610 | 304 | t-BP | 2.0 | 125 | 24.0 | 14,500 |
| 15(g) | Vinyl chloride | 45.0 | 6,700 | 350 | t-BPer | 1.8 | 80 | 4.0 | 17,800 |

Note.—t-BP=tertiary butyl peroxide. t-BPer=tertiary butyl peroctoate.

EXAMPLES 16 TO 29

A reactor containing a grafted hydroxyl-terminated organopolysiloxane prepared in accordance with the procedure described in Example 15, is evacuated for about 10 minutes and a cross-linking agent prepared in accordance with the procedures described in Examples 1 through 14 is added to the reactor and the reaction mass heated to a temperature of about 80° C. with agitation. After about 1 hour, the volatile materials are removed by vacuum distillation and the residual product placed in a mold and allowed to cure at room-temperature. The resulting compositions cured to a tack-free condition over a period of time ranging from about 0.08 to about 1.4 hours. The results of these experiments are illustrated in Table II.

TABLE II

| Example number | Cross-linker | | Grafted organopolysiloxane | | Tack-free time, hrs. |
|---|---|---|---|---|---|
| | Ex. No. | Parts | Example No. | Parts | |
| 16 | 1 | 3.3 | 10(a) | 30.0 | 0.08 |
| 17 | 2 | 3.2 | 10(b) | 29.2 | 0.43 |
| 18 | 3 | 3.5 | 10(c) | 31.0 | 0.3 |
| 19 | 4 | 3.7 | 10(d) | 33.0 | 1.2 |
| 20 | 5 | 3.1 | 10(e) | 30.0 | 0.3 |
| 21 | 6 | 3.6 | 10(f) | 33.0 | 0.3 |
| 22 | 7 | 4.2 | 10(g) | 35.0 | 1.4 |
| 23 | 8 | 3.8 | 10(a) | 33.0 | 1.0 |
| 24 | 9 | 5.1 | 10(c) | 39.0 | 0.5 |
| 25 | 10 | 4.3 | 10(a) | 33.0 | 0.2 |
| 26 | 11 | 4.2 | 10(f) | 32.0 | 1.3 |
| 27 | 12 | 4.0 | 10(e) | 31.0 | 0.7 |
| 28 | 13 | 4.0 | 10(b) | 28.0 | 0.4 |
| 29 | 14 | 4.0 | 10(a) | 32.0 | 0.5 |

When the above examples are repeated utilizing other disilanes with other grafted hydroxyl-terminated organopolyisloxanes, substantially the same results are obtained.

Although specific examples of the invention have been described herein, other variations and modifications falling within the spirit and scope of the appended claims are to be included therein.

The invention claimed is:

1. An organopolysiloxane composition which is curable to an elastomeric solid when exposed to atmospheric moisture having the general formula:

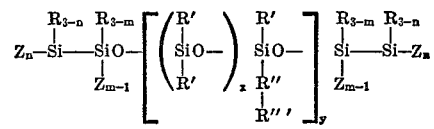

wherein R and R' are radicals selected from the group consisting of monovalent hydrocarbon radicals, halogenated monovalent hydrocarbon radicals and cyanoalkyl radicals; R" is a divalent hydrocarbon radical; R''' is a polymeric organic radical linked to R" by a carbon-to-carbon linkage, said polymeric radical is derived from an organic monomer containing ethylenic unsaturation which is selected from the class consisting of straight chain olefins, whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles; Z is a group hydrolyzable by ambient moisture; $m$ is a number of from 1 to 3 and $n$ is a number of from 0 to 3 and the sum of $m$ and $n$ is greater than 2; $x$ is a number of from 0 to 20,000 and $y$ is a number of from 1 to 500.

2. The composition of Claim 1 wherein Z is selected from the group consisting of acyloxy radicals, hydrocarbonoxy radicals, aminooxy radicals, amino radicals, oximo radicals, amido radicals and phosphato radicals.

3. The composition of Claim 1 wherein Z is an oximo radical.

4. The composition of Claim 1 wherein Z is an aminooxy radical.

5. The composition of Claim 1 wherein Z is a phosphato radical.

6. The composition of Claim 1 wherein Z is an amino radical.

7. The composition of Claim 1 which contains a filler.

8. The composition of Claim 1 wherein Z is an amido radical.

9. The composition of Claim 1 wherein Z is an acyloxy radical.

10. A solid elastomeric material which is obtained by exposing the composition of Claim 1 to atmospheric moisture.

11. The composition of Claim 1, wherein the polymeric organic radical is derived from styrene and butyl acrylate.

References Cited

UNITED STATES PATENTS 3,661,816   5/1972   Pepe et al. _____ 260—18 S

MELVYN I. MARQUIS, Primary Examiner

U.S. Cl. X.R.

117—123 D, 135.1; 260—37 SB, 46.5 G, 46.5 D, 46.5 E